(12) United States Patent
Donker et al.

(10) Patent No.: US 7,219,162 B2
(45) Date of Patent: May 15, 2007

(54) SYSTEM AND METHOD FOR ACCESSING CONTENT OF A WEB PAGE

(75) Inventors: Hans Donker, Hellevoetsluis (NL); Edward E. Kelley, Wappingers Falls, NY (US); Tijs Y. Wilbrink, Voorburg (NL)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 10/307,921

(22) Filed: Dec. 2, 2002

(65) Prior Publication Data

US 2004/0107296 A1 Jun. 3, 2004

(51) Int. Cl.
*G06F 13/00* (2006.01)
(52) U.S. Cl. .................. 709/245; 707/5; 715/501.1
(58) Field of Classification Search .......... 709/225, 709/245, 232, 223, 224; 715/501.1; 707/2–5, 707/100
See application file for complete search history.

(56) References Cited

U.S. PATENT DOCUMENTS

| 5,913,215 | A | | 6/1999 | Rubinstein et al. | |
| 5,974,445 | A | | 10/1999 | Pivnichny et al. | |
| 6,009,459 | A | * | 12/1999 | Belfiore et al. | 709/203 |
| 6,035,330 | A | | 3/2000 | Astiz et al. | |
| 6,317,788 | B1 | | 11/2001 | Richardson | |
| 6,338,082 | B1 | * | 1/2002 | Schneider | 709/203 |
| 6,633,316 | B1 | * | 10/2003 | Maddalozzo et al. | 715/854 |
| 6,895,430 | B1 | * | 5/2005 | Schneider | 709/217 |
| 6,901,436 | B1 | * | 5/2005 | Schneider | 709/219 |
| 7,031,968 | B2 | * | 4/2006 | Kremer et al. | 707/100 |
| 2002/0156776 | A1 | * | 10/2002 | Davallou | 707/3 |
| 2003/0078992 | A1 | * | 4/2003 | Kirkwood et al. | 709/218 |
| 2003/0110295 | A1 | * | 6/2003 | Suzuki et al. | 709/245 |
| 2005/0108626 | A1 | * | 5/2005 | Ong | 715/511 |

FOREIGN PATENT DOCUMENTS

| EP | 1006462 A2 | * | 6/2000 |
| WO | WO 9954832 A1 | * | 10/1999 |

* cited by examiner

*Primary Examiner*—Kenneth R. Coulter
(74) *Attorney, Agent, or Firm*—DeLio & Peterson, LLC; Kelly M. Nowak; James J. Cioffi

(57) ABSTRACT

A process and system for visually displaying to a user at a client computer alternative web pages to a desired web page. The invention locates these alternative web pages in search engines by searching for alternative cached copies of web pages and/or mirror sites. A user may view a hotlink to a desired web page on an accessed web page and either be provided with a table of alternative web pages for manually selecting the alternative web page or the invention may automatically, dynamically select the best alternative web page to the originally selected web page.

21 Claims, 6 Drawing Sheets

SYSTEM AND METHOD FOR ACCESSING CONTENT OF A WEB PAGE

RELATED APPLICATION

Aspects of the present invention are related to subject matter disclosed in co-pending application Ser. No. 10/307,955 filed Dec. 2, 2002, entitled "System and Method For Determining the Availability of a Web Page" by the same inventors, filed on even date herewith and assigned to the assignee of the present invention, the disclosure of which is hereby incorporated by reference.

BACKGROUND OF THE INVENTION

1. Field of the Invention

The present invention relates generally to search engines, and more particularly, to a method and system to automatically present the user with alternative web pages of requested web pages.

2. Description of Related Art

In the course of accessing information by means of a web browser from a network, such as the Internet or a company or office intra-net, a user often finds a web page at a particular URL (Uniform Resource Locator) address that contains information the user would like to access. The web page typically contains several links to a variety of other web pages on its serving equipment or on the serving equipment that presents these other web pages.

Often, a user desires to visit certain ones of these other web pages. In so doing, the user may manually move the cursor over and click on the desired link or URL displayed on the viewed web page. After the user has manually clicked on the link to the desired web page, the web browser then tries to retrieve the desired linked web page and visually display this desired web page to the user.

In the prior art, the retrieved results of this request by the user typically include the user being presented with the desired web page, a "page not found" message from the proxy server, or a long delay or wait period that indicates the web browser is not successfully retrieving the content which resides on the web server that the link refers to and that is to produce the desired web page. Wherein the web page is presented to the user, the presented page may have been changed or updated, or the presentation of such page be slow leading to time delays, which both decrease user productivity, increase user irritation and decrease user web experience. The access of pages that result in a "page not found" message may include those web pages that have been deleted or taken offline, also wasting user time and productivity and increasing user irritation.

Processes and systems for determining the success rate at which a user will be able to link to a desired web page have been developed in the art. Such processes and systems include those that use search requests, such as, searching content on web pages, validating stored bookmarks, and usage of historical data access through a proxy server. However, once it is determined that a desired web page is slow in access, not available, has been changed or taken off line, the user must then manually search for another similar web page and attempt to link thereto, potentially resulting in another changed web page or web page not found message. The process of manually searching for alternative web pages to a desired web page is tedious, time consuming, inefficient and still being dependent on manual input of the user for process initiation. Accordingly, a need exists in the art for a process and system that dynamically provides alternative web pages to desired web pages.

Bearing in mind the problems and deficiencies of the prior art, it is therefore an object of the present invention to provide a process and system that provides alternative web pages to a requested web page, of which the originally requested web page is slow, has been deleted, updated or taken offline, whereby these alternative web pages are dynamically presented to the user to allow the user to quickly and easily link thereto at least one of the alternative web pages.

It is another object of the present invention to provide a process and system of visually displaying alternative web pages of a desired web page to the user to allow the user to quickly and easily link thereto at least one of the alternative web pages.

Another object of the present invention is to provide a process and system that enables the user to manually select the best performing alternative web page from a list of alternative pages.

A further object of the invention is to provide a process and system that dynamically provides the user with the best performing alternative web page from a list of alternative pages.

Yet another object of the present invention is to provide a process and system that provides a user with alternative web pages resulting in reduced network congestion.

Still another object of the invention is to provide a process and system that provides a user with alternative web pages that is not dependent on manual searching for alternative web pages.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a process of presenting alternative web pages of a requested hyperlink to a user at a client computer. The process includes accessing a first web page having hyperlinks to other web pages, selecting a first hyperlink, locating at least one alternative web page for the first hyperlink in a search engine and visually displaying the located alternative web page to the user at the client computer. In accordance with the invention, the at least one alternative web page may comprise a cached web page located in the search engine, or alternatively, an online mirror site.

In particular, the instant process of locating the at least one alternative web page for the first hyperlink includes selecting the search engine from at least a first database of search engines and searching for the at least one alternative web page in the search engine using information derived from the first hyperlink. The located at least one alternative web page is then checked for performance and availability using a ping protocol and the located alternative web page is stored into memory.

The process may continue by searching for a plurality of alternative web pages in all search engines remaining in the database of search engines. Each alternative web page is then checked for performance and availability and the results stored into memory. In storing these results, the alternative web pages may include both cached web pages and online mirror sites.

Further, the process may continue by ranking each of the stored alternative web pages by performance, listing each of the ranked alternative web pages in a table of alternative web pages and visually displaying this table of alternative web pages to the user. The user may then manually select a best performing alternative web page from the table of alternative web pages. Alternatively, the invention may dynamically rank each of the stored alternative web pages by performance and then dynamically select and display to the user the best performing alternative web page.

In accordance with the invention, the information derived from the first hyperlink may include a URL of the first hyperlink thereby locating a cached copy of the first hyperlink. Alternatively, the information derived from the first hyperlink may include content residing on a cached copy of the first hyperlink thereby locating a mirror site of the first hyperlink.

The mirror site of the first hyperlink may be located in the search engine by searching for a cached copy of the first hyperlink in the search engine using a URL of the first hyperlink and then identifying the cached copy of the first hyperlink. Once the cached copy is identified, content from this cached copy is gathered and then the mirror site of the first hyperlink containing this content from the cached copy is located. Wherein a plurality of mirror sites are located in accordance with the invention, these plurality of mirror sites are available online to allow browsing over a plurality of servers thereby spreading server load and avoiding web site congestion.

In another aspect, the invention provides a process for deploying computing infrastructure including integrating computer-readable code into a computing system, wherein the code in combination with the computing system is capable of presenting alternative web pages of a requested hyperlink to a user at a client computer. These alternative web pages are presented by accessing a first web page having hyperlinks to other web pages, selecting a first hyperlink, locating in a search engine at least one alternative web page for this first hyperlink and visually displaying the located alternative web page to the user at the client computer.

In still another aspect, the invention provides a system for presenting alternative web pages of a requested hyperlink to a user at a client computer. This system performs the steps of accessing a first web page having hyperlinks to other web pages, selecting a first hyperlink, locating in a search engine at least one alternative web page for this first hyperlink and visually displaying the located alternative web page to the user at the client computer.

In the step of locating the alternative web page, the system further performs the steps of selecting the first search engine from a first database of search engines, searching for alternative web page using information derived from the first hyperlink and checking the performance and availability of the located alternative web page using a ping protocol. Alternatively, the system may further perform the steps of continuing searching for a plurality of alternative web pages in all search engines remaining in the database, checking the performance and availability for each located alternative web page and then storing each of these alternative web pages into memory.

Once the alternative web pages are stored into memory, the system further performs the steps of ranking the stored pages by performance, listing all ranked pages in a table of alternative web pages and visually displaying this table to the user who may then manually select a best performing alternative web page. Alternatively, the system may perform the steps of dynamically ranking each stored alternative web page by performance and dynamically displaying a best performing alternative web page to the user at the client computer.

In yet another aspect, the invention provides a program storage device readable by a machine, tangibly embodying a program of instructions executable by the machine. The program storage device performs the method steps for a process of presenting alternative web pages of a requested hyperlink to a user at a client computer. These method steps include accessing a first web page having hyperlinks to other web pages, selecting a first hyperlink, locating in a search engine at least one alternative web page for this first hyperlink and visually displaying the located alternative web page to the user at the client computer.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

Figure 1:
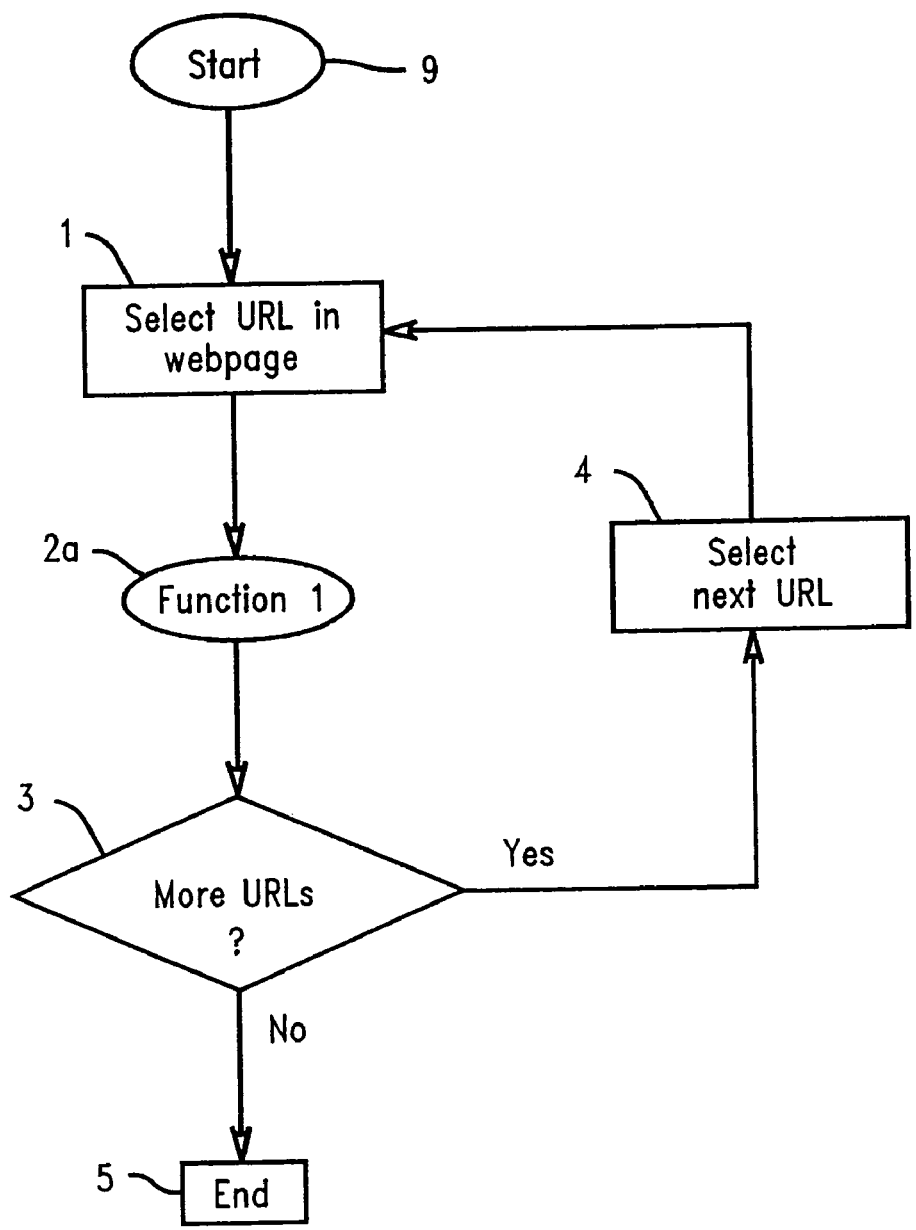
FIG. 1 illustrates the initiating process flow of the preferred embodiment of the invention for automatically presenting a user with alternative web pages of requested web pages.

DESCRIPTION OF THE PREFERRED
EMBODIMENT(S)

In describing the preferred embodiment of the present invention, reference will be made herein to FIGS. 1–6 of the drawings in which like numerals refer to like features of the invention. Features of the invention are not necessarily shown to scale in the drawings.

The present invention solves the problems in the art by avoiding the time consuming, tedious and inefficient tasks of manually clicking on a hotlink for the purpose of linking thereto a desired web page only to find out that the retrieval of the desired page is slow, the page has been deleted, updated or taken offline. The invention overcomes such problems in the art by providing a system and method that dynamically and visually displays to a user at a client computer alternative web pages to a desired web page. The invention allows for the user to merely view a hotlink to a desired web page on an accessed web page and automatically be provided with alternatives to such desired web page. Preferably, the alternative web pages are viewed by a mouse-over of the hotlink, whereby the hotlinks of alternative web pages are visually displayed to the user. In an alternative embodiment, as described in FIG. 5, the user is automatically directed to the alternative URL with the best performance upon selection of the original hyperlink, thereby avoiding having to manually type a URL into a search field of a search engine. Accordingly, the invention avoids the need for the user to manually click on a link to a desired web page only to find out such page is no longer available, has changed or the connection is slow. It enables the user to quickly and easily link to alternative web pages of a desired web page using storage of cached web pages in search engines. The invention also provides a system and method to search for mirror sites to present as alternatives for the web page the user requests.

Once it is determined that the desired web page is slow in access, has been changed or is not available, the instant invention dynamically provides the user with alternative URLs to the desired web page by utilizing search engines. The alternative web pages may be cached copies of the desired web page that are stored in a selected search engine and/or mirror sites within the selected search engine. In accordance with the invention, the desired, unavailable or badly performing web page is forwarded to a selected search engine for providing information pertaining to the availability of cached copies of such web page. If cached copies of the web page exist within the search engine, these available cached copies are used as alternative web pages to the originally selected web page. In addition, if it is determined that any mirror sites exist within the search engine based on the contents of either the cached copy or a section of HTML from a badly performing URL, these mirror sites are also used as alternative web pages to the originally selected web page. Either the web browser, or the accessed web page containing the hyperlink, then dynamically change the URL of the hotlink if the desired web page is either not available or performing badly.

Definitions relevant to the present invention are as follows:

IP address: The Internet Protocol (IP) is the method or protocol by which data is sent from one computer to another on the Internet. Each computer on the Internet has at least one IP address that uniquely identifies it from all other computers on the Internet.

URL (Uniform Resource Locator): An Internet address (for example, http://www.hmco.com/trade/), that indicates the server protocol to use in accessing the resource (http), the domain name of the server (www.hmco.com), and the name and location of the resource on that particular server (trade).

Web Page: A block of data available on the World Wide Web, identified by a URL. A web page is stored on a server and is a file written in HTML and any related files for scripts and graphics. It is often hyperlinked to other documents on the Web.

Hot Link: A URL on a web page.

HTML: Hypertext Markup Language.

Server: A computer or device on a network that manages network resources.

Web browser: A software application vised to locate and display web pages.

Ping: A traditional ping is a utility to determine whether a specific IP address is accessible. The instant invention adds further functionality to that of a traditional ping by providing an improved ping (the "sent ping") with the added ability of validating or determining if the file structure is available at a specific IP address. The instant "sent ping" also has the ability to validate multiple file structures on a common server in a single transaction.

Web Site: A collection of web pages which share a URL, such as, www.ibm.com.

Mirror Site: A web site of which content is similar to another web site, whereby the two web sites reside on different URLs. In case of expected high utilization of a specific web site, like www.cnn.com in time of disasters, one may decide to make content available on a mirror site residing on a different server, thereby spreading these server peak loads over various servers.

The instant invention will be better understood in accordance with the description of the invention as described in detail below with reference to FIGS. 1–6.

Flow charts for the preferred embodiment are shown in FIGS. 1–6 wherein numerals in circles indicate connections to like numerals in other parts of the figures. These figures describe the operations of the preferred embodiment on a client computer running a web browser. The flow charts of FIGS. 1–6 are described more fully below.

Referring to FIG. 1, the process flow of a preferred embodiment of the instant invention is initiated when a user, at a client computer, links to a web page, the web page is loaded into the web browser of the client computer and the user selects a desired hyperlink on the accessed web page (step 9). All hyperlinks or URLs in the source of the web page are located and identified (step 1), and then each one is checked to determine whether alternative cached copies of such hyperlink are available in search engines (Step 2a "Function 1"). Alternatively, as discussed in more detail below, the invention may search for mirror sites instead of cached copies on search engines (Step 2b "Function 2" of FIG. 6). Thus, the user of the invention is provided with the ability to search for only alternative web pages, only mirror sites, both alternative web pages and mirror sites simultaneously, or both alternative web pages and mirror sites sequentially. In steps 2a and 2b, Functions 1 and 2 not only check for the availability of both alternative web pages and mirror sites, they also check the performance of such pages to indicate to the user which pages perform the most like the requested web page or those pages that are most similar to the requested web page. As shown in step 3, once a hyperlink or URL is checked for alternatives or mirror sites, the invention checks for more hyperlinks on the accessed web page. If there are no more hyperlinks, the process ends in step 5. If more hyperlinks exist on the accessed web page, the next hyperlink is checked for both alternative web pages and mirror sites in step 4. The process flow of the invention continues for all hyperlinks on an accessed web page.

Figure 2:
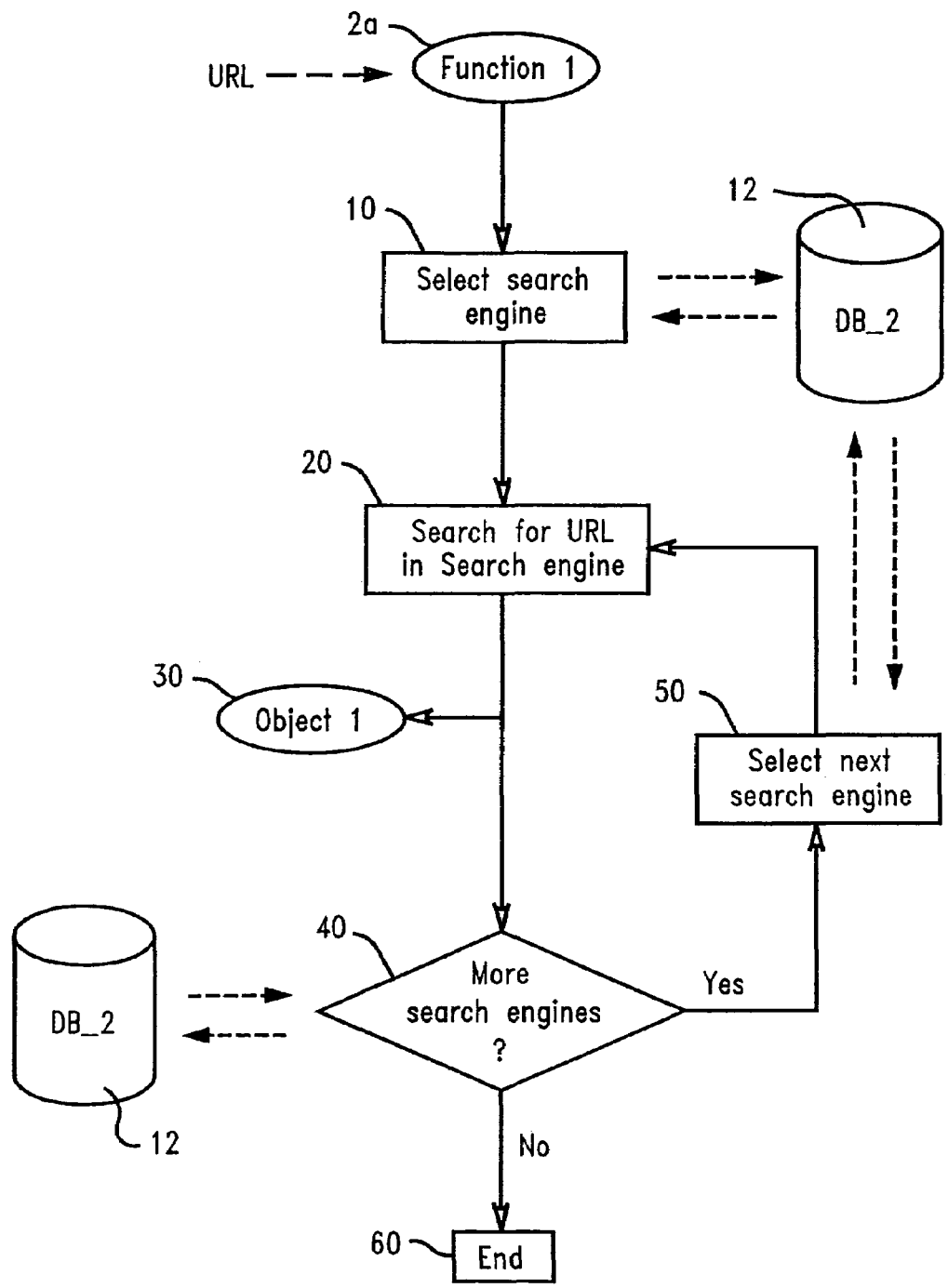
FIG. 2 illustrates that the process flow of FIG. 1 continues to search for cached copies of web pages in search engines.

FIG. 2 illustrates the process flow of Function 1 (step 2a) of the main process flow of FIG. 1 in more detail. As shown, a desired hyperlink/URL is forwarded to Function 1 to check for available cached copies and/or mirror sites and their performance by searching for the same in search engines. Search engines actively gather information from the entire Internet, store this information and make this available to Internet users, mainly for searching on keywords. Recent changes in technology and requirements have led to many search engines storing not just words, but the entire content, including the layout of web pages.

In searching for available cached copies and/or mirror sites in search engines, the process flow of the invention proceeds by selecting a first search engine from a first database 12 in which addresses of search engines are stored by known techniques, for example as shown in the below table (step 10).

| Table of Search Engines |
|---|
| www.google.com |
| www.altavista.com |
| www.yahoo.com |
| ... |

The present solution then automatically searches for cached copies in the selected search engine using the desired, originally selected hyperlink URL address as input information for the search of finding cached alternative web pages (step 20). The selected search engine then retrieves the URL address of the cached copy of the desired hyperlink. This cached URL or alternative web page, which is stored in cache of the selected search engine, is stored in memory and fed forward to "Object 1" for checking this alternative URL's performance and availability (step 30). The process flow of FIG. 2 continues for all search engines listed in the first database 12 (step 40). If there are no more search engines, the process flow ends (step 60). If more search engines do exist within database 12, the process flow continues by selecting the next search engine (step 50) and checking for availability and performance of alternative web pages to a desired web page (step 20).

In checking for performance and availability of the found cached web pages, Function 1 of step 2a initiates Object 1 of step 30 by feeding forward the URL of the cached copy along with its time and date on which it is stored in the search engine. Object 1 of step 30 then checks both the performance and availability of the URL of this alternative cached copy web page and then stores the URL address of those found cached copies in memory.

Figure 3:
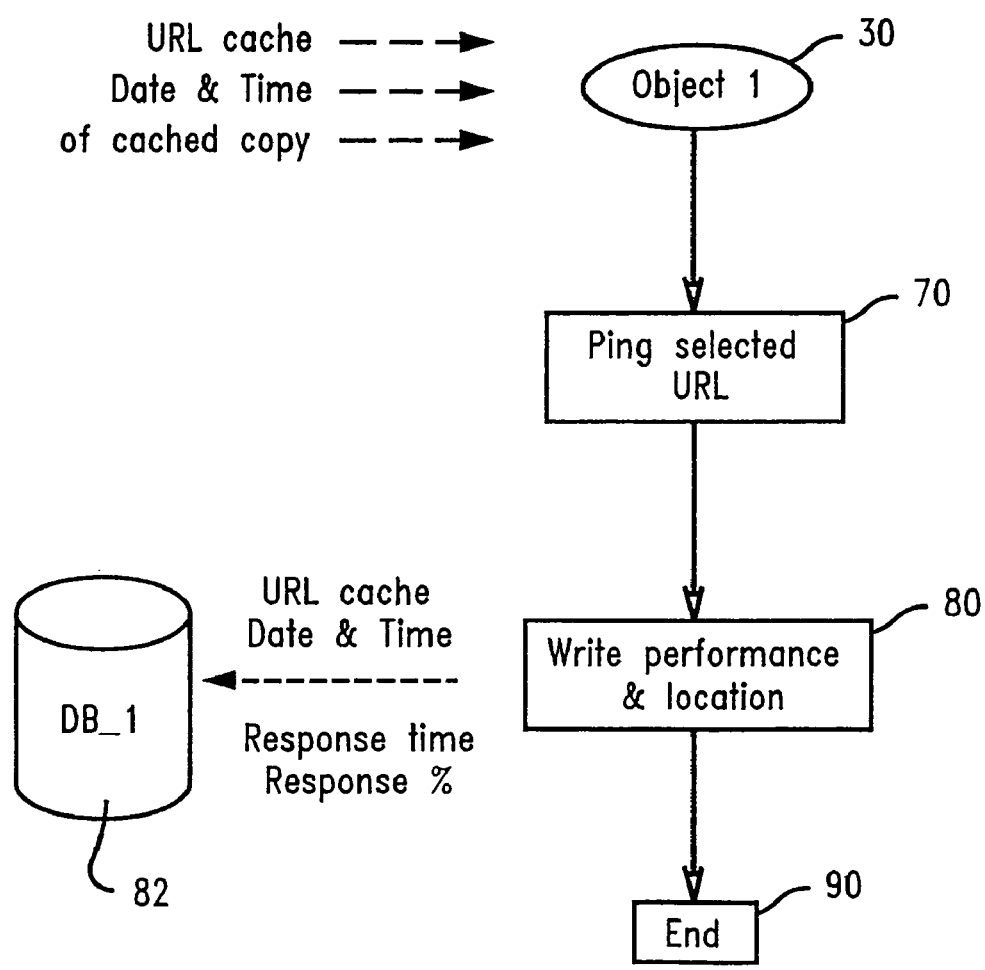
FIG. 3 illustrates that the process flow continues by checking the performance and the availability of the found cached copies in FIG. 2.

In so doing, referring to FIG. 3, the URL of the selected cached copy is checked on its performance and availability using a ping protocol, i.e., it pings the database using the URL of the selected cached copy as input (step 70), whereby the date and time of this cached copy may be derived from the information stored in the search engine, or alternatively, from the information stored in the content of the cached copy itself. In accordance with the invention, the URL of this cached copy may be different from the URL of the search engine, such as wherein the cached copy is derived from a mirror site.

The results of checking the performance and availability of the cached URL copies using the ping protocol are then forwarded to step 80 to write the performance and location of such cached copies. For those URL addresses of cached copies that are found within database 12 using the ping protocol, the ping results, indicating the response time and received number of responses, are written into a computer memory indicated by database 82 in step 80. This database 82 stores data on all available alternative web pages for future reference. In step 80, wherein the URL addresses of cached copies are not found, the process flow of FIG. 3 ends without data being written to database 82 (step 90). Preferably, those URLs checked for available cached copies that are not found, or are not available, are indicated by a ping timed out.

Once the found alternative web pages are written to memory in step 30, these found alternative pages are then presented to the user at the client computer via the alternative URL addresses. In so doing, the invention either allows the user to indicate if he prefers to either manually select an alternative web page, as shown by the process flow of FIG. 4, or have the system dynamically choose the best performing alternative web page, as shown by the process flow of FIG. 5.

Wherein the user decides he would like to manually select an alternative web page, he may do so by choosing a desired alternative web page from a table of alternative web pages as discussed further below in reference to FIG. 4. As shown, once the user initiates the invention by linking to a web page and selecting a desired, original hyperlink on the accessed web page (step 9), the user is automatically provided with a table of alternative web pages if it is determined via the invention that this originally selected web page is not available or performing worse than those found alternative pages. If no alternative web pages are found, the user will not be presented with alternative web pages to the originally selected web page.

In presenting the found alternative web pages to the user, the invention first checks the availability and performance of the desired, originally selected web page in step 9 using a ping protocol (step 100). The results of the found alternative web pages stored into memory (step 80) and are then used to select those alternative web pages that are either available or perform better than the desired, originally selected web page (step 110). The better performing alternative web pages are then ranked to performance and listed in a table of alternative web pages (step 120). If no alternatives exist, no table is created and the process ends.

The table of alternative web pages is stored and presented to the user by visually displaying the same to the user at the client computer (step 130). Once all alternative web pages are found, ranked and listed in the table of alternatives, the process of finding, ranking and listing alternative web pages to a desired web page stops and the created table is presented to the user at the client computer. In ranking the found alternative web pages, the invention indicates those alternative web pages that will perform better than other alternative pages as well as those that perform better than the originally selected web page. The best performing alternative web page is then selected by the user from the table of alternatives for viewing at the client computer and the process ends for the originally selected URL (step 140). However, in accordance with the invention, once the user links to the web page of the selected alternative web page in step 130, the invention will begin to run for this newly selected and accessed alternative web page.

For example, a user of the invention may be presented with a Table of URL Alternatives as shown below. As shown, an originally selected URL, such as www.eds.com for example, may not be available online. The invention searches for cached copies in several different search engines, and locates the best performing alternative in www.google.com. In accordance with the invention, once the alternative web pages are found, the user may be presented with several alternatives when moving the cursor over the originally selected URL. Alternatively, as described FIG. 5, the user will be automatically, dynamically directed to the cached copy at www.google.com once the desired hyperlink is selected.

Table of URL Alternatives

| Original URL | Performance | Availability | Alternative Cached URL | Performance | Availability | Date Cached | Time Cached | Online |
|---|---|---|---|---|---|---|---|---|
| www.eds.com | 7 ms | 100% | www.google.com/ . . . | 6 ms | 100% | Jul. 4, 2002 | 08:16:46 AM EST | No |
| www.eds.com | 7 ms | 100% | www.msn.com/ . . . | 10 ms | 90% | May 8, 2002 | 11:16:45 PM EST | No |
| www.eds.com | 7 ms | 100% | www.altavista.com/ . . . | 14 ms | 100% | Jul. 6, 2002 | 9:20:08 AM EST | No |

Figure 4:
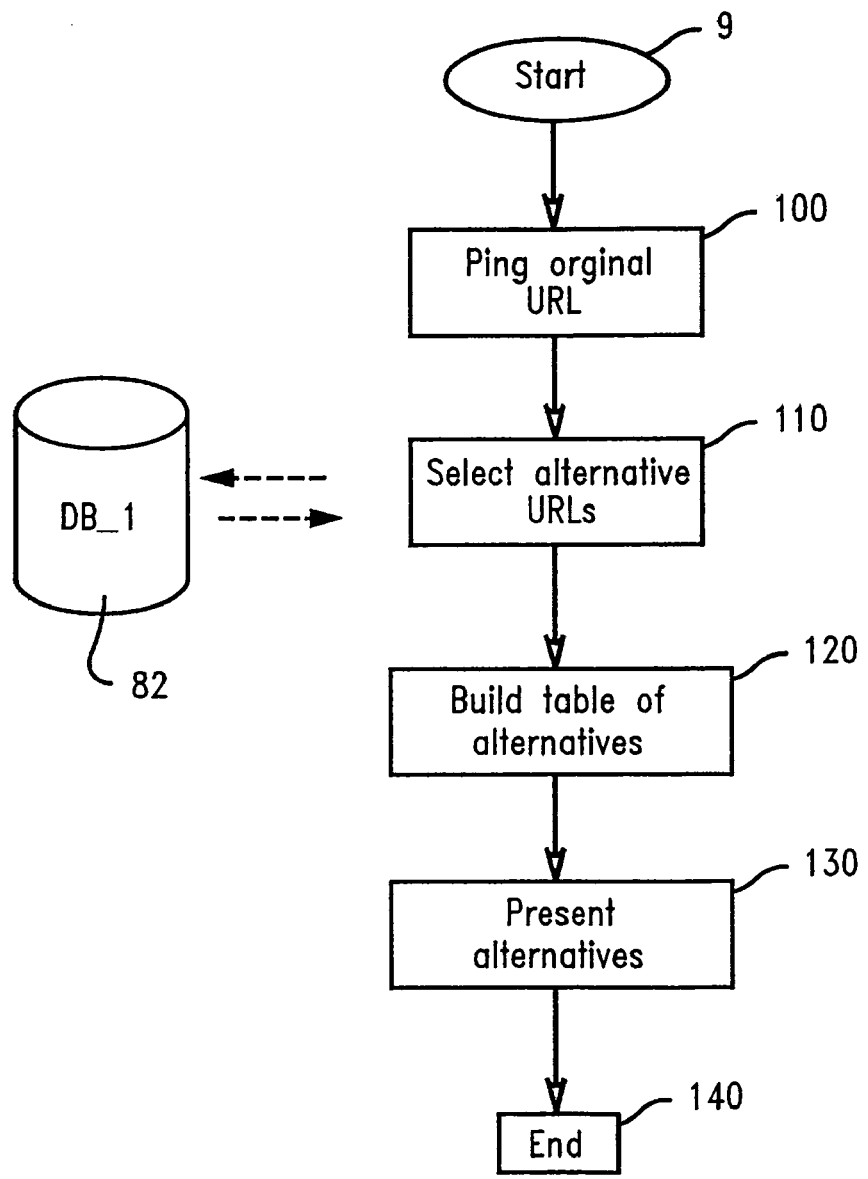
FIG. 4 illustrates that the user is presented with alternative web pages to those cached copies in FIG. 3 that are determined to be unavailable or perform poorly.
Figure 5:
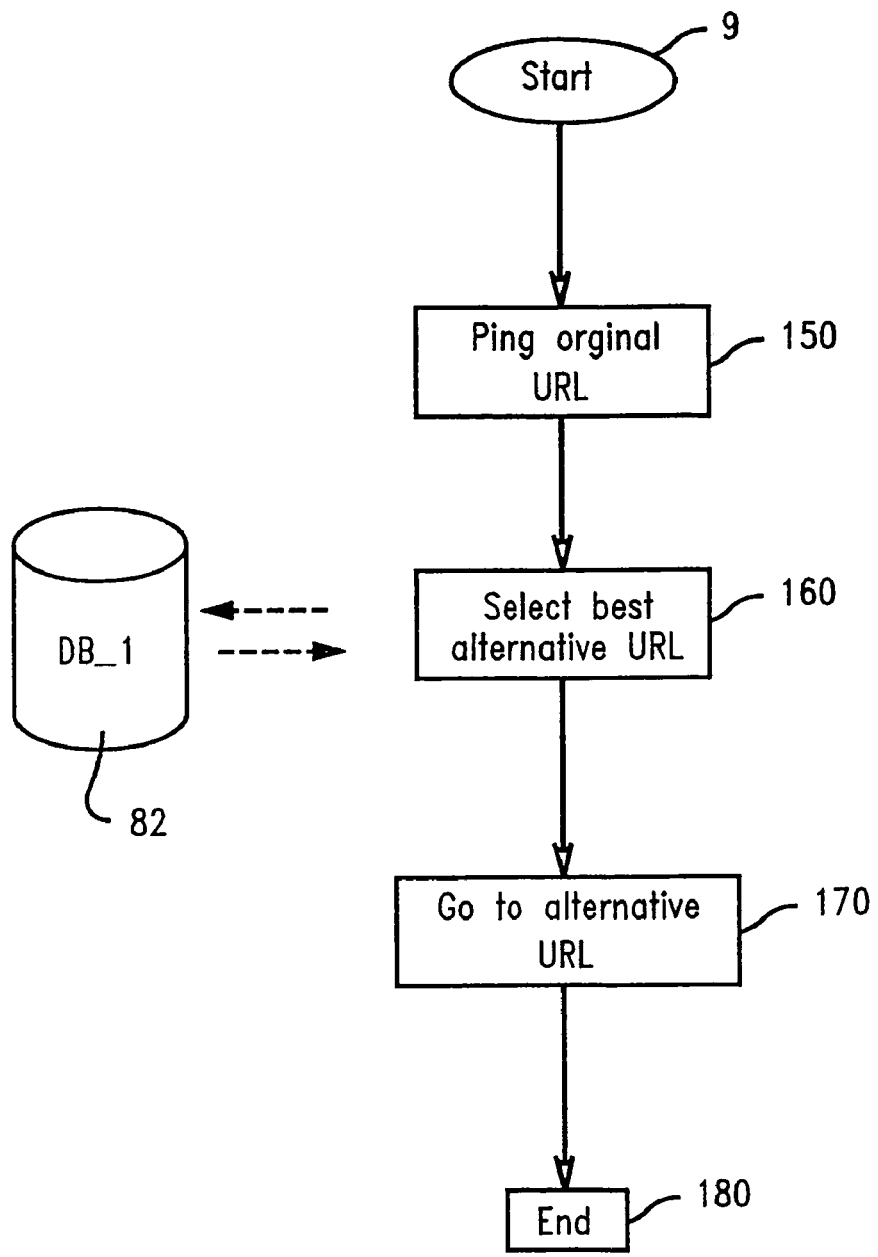
FIG. 5 illustrates an alternative embodiment in which the process flow described in FIG. 3 continues with automated selection of the best alternative web page among the alternatives found in step 80.

Alternatively, rather than having the user manually choose the best alternative web page as shown in the process flow of FIG. 4, the invention may dynamically provide the user with the best alternative web page for viewing at the client computer, as shown in the process flow of FIG. 5. In accordance with the invention, the user may be presented with either of these preferences at the client computer whereby the user may select either manual selection of alternative web pages or automated selection of the best alternative web page.

FIG. 5 illustrates the process flow of the embodiment of automated selection of the best alternative web page. As shown, once the user initiates the invention by linking to a web page and selecting a desired, original hyperlink on the accessed web page (step 9), the user is dynamically provided with the best alternative web page among the alternative pages found in step 80. If no alternative web pages are found, the user will not be dynamically presented with the best alternative web pages.

In this embodiment of dynamically providing the user with the best alternative web page, the invention first checks the availability and performance of the desired, originally selected web page in step 9 using a ping protocol (step 150). The instant automated system and process then dynamically ranks the found alternative web pages stored into memory in step 80 and dynamically selects the best alternative web page to the desired, originally selected web page from these ranked alternative web pages (step 160).

Once the alternative web page is selected, the invention then dynamically changes the URL of the originally selected web page to the URL of the automated chosen best performing cached alternative web page and the browser of the client computer directly accesses this dynamically selected best alternative web page (step 170). Links in this cached alternative web page may also be dynamically changed to the URL of the link on the original, desired web page. Once the link of the selected best alternative is dynamically changed, the process flow ends for the originally selected URL (step 180). Again, in accordance with the invention, once the browser links the user to this dynamically chosen web page, the invention will begin to run for this newly selected and accessed alternative web page to check this page for further, better performing alterative web pages. Accordingly, the process of determining availability and performance of the selected alternative web page will be running, potentially resulting in still further alternative web pages to the first alternative web page being selected or presented to the user.

Figure 6:
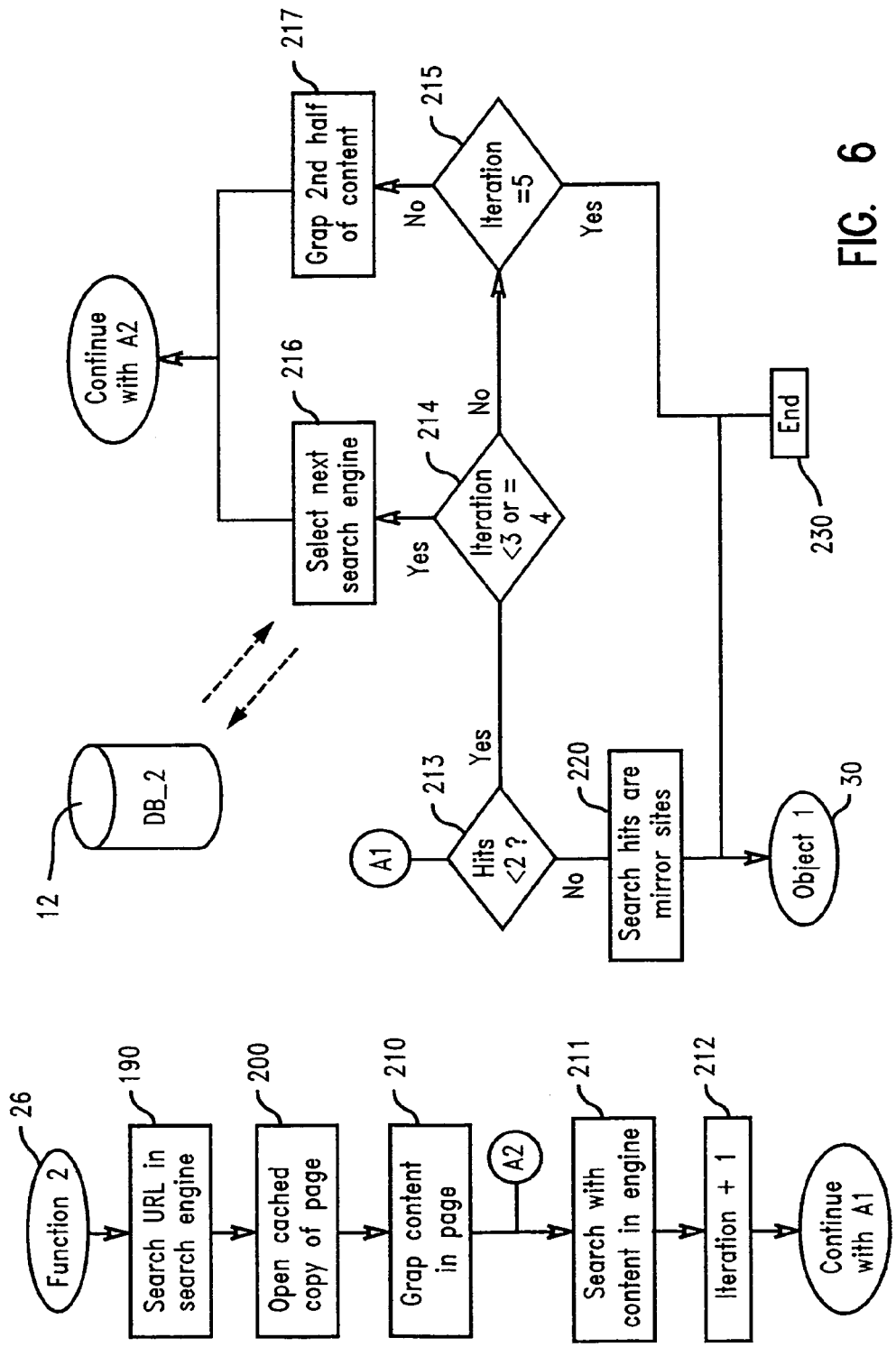
FIG. 6 illustrates an alternative embodiment of the invention of searching for mirror sites of requested web pages by using search engines.

As discussed above, the invention may also search for mirror sites as alternative web pages for originally selected web pages, the process flow of which is shown in FIG. 6. Function 2 as indicated by reference numeral 2b searches for mirror sites by using search engines. Typically, if a first time user of a web page finds out the originally requested web page is unavailable, or poorly performing, he cannot derive the location of existing mirror sites without extensive and time consuming manual labor. The instant process and system allows the user to locate these mirror sites, without the original web being available.

"Function 2" (step 2b) locates a cached copy of the requested web page in one or more search engines, and uses the content on the cached copy to search for web pages that have the same content, i.e., they are considered to be mirror sites of the requested web page. Performance and availability checks are then performed on these identified mirror sites via Object 1 (step 30). Once the user requests to open a desired web page by clicking on the hyperlink of the page which is loaded into the web browser, the user will automatically be presented with the better performing "live" alternative URLs of the mirror sites. Opposed to "Function 1" of step 2a, which identifies and locates stored cached copies of alternative web pages, "Function 2" of step 2b identifies and locates alternative web pages that are currently available online, thus providing advantages in browsing through the pages of the website. Further, should these alternative mirror sites be performing badly, the instant process and system identifies alternative web pages to these mirror sites in accordance with the invention as described above. Function 2 of step 2b further enhances the invention by providing additional searching on a second server. As discussed above, Function 1 of step 2a uses search engines to access stored copies of web pages, whereby when a large number of users access a given web page on the same server simultaneously, performance may be slowed down. Function 2 of step 2b provides the capability of browsing on another server, thereby spreading server load and capacity requirements.

Referring to FIG. 6, "Function 2" (step 2b) initiates the instant invention to identify and check the performance and availability of alternative mirror sites. As shown in step 190, a hyperlink location is typed into a search field in a selected search engine. In so doing, the system and process retrieve both URLs of cached copies from the search engine as well as URLs of online web pages stored in memory that are fed forward to Object 1 (step 30) which checks the performance and availability of these online URLs. At least one of the found cached copies of the desired web page is opened (step 200) and its contents, including both text and images, are displayed and stored in memory (step 210). Using the content of this displayed web page, a search is then performed in a first search engine (step 211) resulting in at least one result (step 212). It is then determined if the results provided include a plurality of found alternative mirror sites containing such content or only the originally selected web page (step 213).

In step 213, if the results include a plurality of found alternative mirror sites, i.e., the results provide more than 2 hits, the process flow continues to step 220 wherein the found alternative web pages, which may include both online mirror sites as well as cached copies available in the search engines as discussed above, are stored in memory. Object 1 of step 30 is then initiated to check the availability and performance of these found URLs.

Alternatively, in step 213, if no mirror sites are identified within the search engine, the results provide only the originally selected web page, i.e., the results provide less than 2 hits. The process of searching for mirror sites using the content of the displayed web page is then repeated a number of times (step 214), i.e., less than or equal to 4 times, by the invention selecting another search engine (step 216) to search for the content of the displayed web page (step 211) on these other selected search engines, and checking for the number of hits on these other search engines (step 213). This process continues until the system repeats checking alternative search engines for the set number of times, i.e., repeats 4 times. Once the instant process and system exceed the set number of times (step 215), i.e., it is being repeated 5 times, and it is determined that no found alternative online mirror sites exist to the originally selected web page, then the process flow continues by selecting the second half of the content of such originally selected web page (step 217) and searching for alternative online mirror sites for this original web page using the process and system as described above in relation to FIG. 6. If it is determined that no alternative online mirror sites exist for the originally selected web page by searching search engines using the second half of the content of this original web page, then the process flow stops (230). This second half of the content of the page is deleted from memory, as the URLs, like locations of images and/or other pages on the site, used in the page might be different from the original page and are not suitable for further usage.

In a further aspect, the invention provides a computer-readable code. The computer-readable code may be deployed into the computer system by sending it to a central server, or group of center servers, and then downloading it into the client computers that require the invention. Alternatively, the computer-readable code may be either detached to a directory or loaded into a directory by a button on an e-mail that executes a program for detaching the computer-readable code into such directory. Still another alternative is to send the computer-readable code directly to a directory on the client computer hard drive.

Advantageously, the invention allows a user to have the option to seek alternatives for an unavailable desired web page or a poorly performing web page. In providing cached copies in search engines as alternatives to a desired web page, the invention also advantageously allows web pages that may have been deleted or taken offline to still be accessed via their cached copies. Still further, in accordance with the invention, the code of the web page may include information for locating online mirror sites. The invention improves the ease and friendliness of web browsing to a user by allowing such user to easily determine and access alternative web pages to desired web pages that are not available or are poorly performing. This invention also saves the user time, makes web browsing easier, enhances user productivity, avoids potential user irritation and improves user web experience.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A process of presenting alternative web pages of a requested hyperlink to a user at a client computer comprising:
   accessing a first web page having hyperlinks to other web pages;
   selecting a first hyperlink from said hyperlinks on said first web page;
   selecting a search engine from at least a first database of search engines;
   searching for at least one alternative web page in said search engine using information derived from said first hyperlink;
   locating at least one alternative web page for said first hyperlink in said search engine;
   checking the performance and availability of said located at least one alternative web page using a ping protocol;
   storing said located at least one alternative web page into memory; and
   visually displaying said at least one alternative web page to said user at said client computer.

2. The process of claim 1 wherein said at least one alternative web page comprises a cached web page located in said search engine.

3. The process of claim 1 wherein said at least one alternative web page comprises an online mirror site.

4. The process of claim 1 further including the steps of:
   continuing searching for a plurality of alternative web pages in all search engines remaining in said database of search engines;
   checking the performance and availability of each alternative web page located in each of said search engines; and
   storing each of said located alternative web pages into said memory.

5. The process of claim 4 wherein said alternative web pages stored in said memory comprise both cached web pages and online mirror sites.

6. The process of claim 4 further including the steps of:
   ranking by performance each of said stored alternative web pages;
   listing each of said ranked alternative web pages in a table of alternative web pages; and
   visually displaying to said user at said client computer said table of alternative web pages.

7. The process of claim 6 further including the user manually selecting a best performing alternative web page from the table of alternative web pages for viewing at said client computer.

8. The process of claim 4 further including the steps of:
   dynamically ranking by performance each of said stored alternative web pages; and
   dynamically visually displaying to said user at said client computer a best performing alternative web page.

9. The process of claim 1 wherein the step of searching for said at least one alternative web page, said information derived from said first hyperlink comprises a URL of said first hyperlink thereby locating said at least one alternative web page comprising a cached copy of said first hyperlink.

10. The process of claim 1 wherein the step of searching for said at least one alternative web page, said information derived from said first hyperlink comprises content residing on a cached copy of said first hyperlink thereby locating said at least one alternative web page comprising a mirror site of said first hyperlink.

11. The process of claim 10 wherein said mirror site of said first hyperlink is located in said search engine by the steps of:
  searching for a cached copy of said first hyperlink in said search engine using a URL of said first hyperlink;
  identifying said cached copy of said first hyperlink;
  gathering content from said cached copy of said first hyperlink; and
  locating said mirror site of said first hyperlink containing said content from said cached copy.

12. The process of claim 11 wherein a plurality of mirror sites are located, said plurality of mirror sites are available online to allow browsing over a plurality of servers thereby spreading server load and avoiding web site congestion.

13. The process of claim 1 further comprising:
  locating a plurality of alternative web pages for said first hyperlink in said search engine;
  checking the performance of said plurality of alternative web pages;
  ranking said plurality of alternative web pages based on said performance;
  selecting a second web page having hyperlinks from said ranked plurality of alternative web pages; and
  accessing said second web page.

14. The process of claim 13 further including repeating said process steps for said second web page.

15. The process of claim 13 wherein said second web page is manually selected.

16. The process of claim 13 wherein said second web page is dynamically selected based on said ranking of said performance.

17. A system for presenting alternative web pages of a requested hyperlink to a user at a client computer, the system to perform the steps of:
  accessing a first web page having hyperlinks to other web pages;
  selecting a first hyperlink from said hyperlinks on said first web page;
  selecting a search engine from a first database of search engines;
  searching for said at least one alternative web page in said search engine using information derived from said first hyperlink;
  locating at least one alternative web page for said first hyperlink in said search engine;
  checking the performance and availability of said located at least one alternative web page using a ping protocol: and
  visually displaying said at least one alternative web page to said user at said client computer.

18. The system of claim 17 further performing the steps of:
  continuing searching for a plurality of alternative web pages in all search engines remaining in said database of search engines;
  checking the performance and availability of each alternative web page located in each of said search engines; and
  storing each of said located alternative web pages into said memory.

19. The system of claim 18 further performing the steps of:
  ranking by performance each of said stored alternative web pages;
  listing each of said ranked alternative web pages in a table of alternative web pages;
  visually displaying to said user at said client computer said table of alternative web pages; and
  manually selecting a best performing alternative web page from the table of alternative web pages for viewing at said client computer.

20. The system of claim 18 further performing the steps of:
  dynamically ranking by performance each of said stored alternative web pages; and
  dynamically visually displaying to said user at said client computer a best performing alternative web page.

21. A computer-readable storage medium encoded with a program of instructions executable by a machine to perform method steps for presenting alternative web pages of a requested hyperlink to a user at a client computer, said method steps comprising:
  accessing a first web page having hyperlinks to other web pages;
  selecting a first hyperlink from said hyperlinks on said first web page;
  selecting a search engine from a first database of search engines;
  searching for said at least one alternative web page in said search engine using information derived from said first hyperlink;
  locating at least one alternative web page for said first hyperlink in said search engine;
  checking the performance and availability of said located at least one alternative web page using a ping protocol: and
  visually displaying said at least one alternative web page to said user at said client computer.

* * * * *